(12) United States Patent
Hayashi et al.

(10) Patent No.: US 7,608,355 B2
(45) Date of Patent: Oct. 27, 2009

(54) SEAL STRUCTURE OF A FUEL CELL

(75) Inventors: Tomokazu Hayashi, Aichi (JP); Mikio Wada, Aichi (JP); Iwao Myojin, Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 373 days.

(21) Appl. No.: 10/574,565

(22) PCT Filed: Sep. 28, 2004

(86) PCT No.: PCT/JP2004/014576

§ 371 (c)(1),
(2), (4) Date: Apr. 4, 2006

(87) PCT Pub. No.: WO2005/036685

PCT Pub. Date: Apr. 21, 2005

(65) Prior Publication Data

US 2007/0122679 A1    May 31, 2007

(30) Foreign Application Priority Data

Oct. 9, 2003   (JP) .............................. 2003-351100

(51) Int. Cl.
*H01M 2/08* (2006.01)
(52) U.S. Cl. ...................................................... 429/35
(58) Field of Classification Search .................... 429/35
See application file for complete search history.

(56) References Cited

U.S. PATENT DOCUMENTS

| | | | |
|---|---|---|---|
| 6,794,079 B2 | 9/2004 | Inagaki et al. | |
| 6,833,210 B2 * | 12/2004 | Kikuchi et al. | ................. 429/26 |
| 2002/0031698 A1 | 3/2002 | Inoue et al. | |
| 2002/0055027 A1 * | 5/2002 | Inoue et al. | ................... 429/30 |
| 2002/0122970 A1 | 9/2002 | Inoue et al. | |
| 2002/0182471 A1 | 12/2002 | Kralick | |
| 2003/0072988 A1 | 4/2003 | Frisch et al. | |
| 2003/0091885 A1 | 5/2003 | Kobayashi et al. | |
| 2003/0186106 A1 | 10/2003 | Frank et al. | |

FOREIGN PATENT DOCUMENTS

| | | |
|---|---|---|
| EP | 1 302 996 A2 | 4/2003 |
| JP | 2000-294254 | 10/2000 |
| JP | 2002-124275 | 4/2002 |
| JP | 2003-077499 | 3/2003 |

* cited by examiner

*Primary Examiner*—Patrick Ryan
*Assistant Examiner*—Thomas H. Parsons
(74) *Attorney, Agent, or Firm*—Kenyon & Kenyon LLP

(57) ABSTRACT

A seal structure of a fuel cell includes an interrupted back-up disposed at least one of a connecting gas passage and a connecting coolant passage. The back-up located on one side of a separator and a portion of a seal line located on the other side of the separator are disposed such that the back-up and the portion of the seal line are overlapped with each other in a fuel cell stacking direction. The interrupted back-up may be formed in the seal or in the separator.

10 Claims, 4 Drawing Sheets

SEAL STRUCTURE OF A FUEL CELL

This is a 371 national phase application of PCT/JP2004/014576 filed 28 Sep. 2004, claiming priority to Japanese Application No. 2003-351100 filed 9 Oct. 2003, the contents of which are incorporated herein by reference.

FIELD OF THE INVENTION

The present invention relates to a seal structure of a layer-type fuel cell.

BACKGROUND OF THE INVENTION

As illustrated in FIGS. 8 and 9, a known fuel cell (a unit fuel cell) 1 includes a membrane-electrode assembly (MEA) and a separator 2 disposed on each side of the MEA. A plurality of fuel cells 1 are piled to construct a layer-type fuel cell or a stack. A gas passage 3 is formed in the separator 2 at an MEA opposing surface of the separator 2 and a coolant passage 4 is formed in the separator 2 at an opposite surface of the MEA opposing surface of the separator. A gas seal 5 is disposed for seal between the separators on opposite sides of the MEA and between the separator and the MEA, a coolant seal 6 is disposed for seal between adjacent fuel cells.

As illustrated in FIG. 8, in a case where a seal line of the gas seal 5 around a fuel gas manifold 7, an oxidant gas manifold 8, and a coolant manifold 9 which receives a gas pressure on an MEA opposing side thereof does not extend straight (more particularly, in FIG. 8, since the coolant manifold 9 has a greater width than the gas manifolds 7 and 8, a portion of the seal line of the gas seal 5 beside the coolant manifold 9 is bent and is bulged toward a central portion of a fuel cell surface and so does not extend straight), and in a case where the separator 2 is deformable (such as a carbon separator or a metal separator of about 0.1 mm thickness), the separator 2 experiences a deformation when a gas pressure acts on the separator and the gas seal 5 receives a stress due to the deformation of the separator 2 locally (for example, at a corner "B" of the seal line in FIG. 8). As a result, the gas seal 5 is separated from the separator 2 to generate a possibility of gas leakage.

Further, as illustrated in FIG. 8, a portion of the seal line of the coolant seal 6 does not exist at a connecting coolant passage "C" between the coolant manifold 9 and the coolant passage of the central portion of the fuel cell. As a result, at a portion "D" of FIG. 9 opposite to the passage "C" via the separator 2, a seal force (a fastening force of the stack of fuel cells) does not act on the gas seal 5 and the gas pressure is resisted only by an adhering force of the gas seal 5. Therefore, the gas seal 5 is likely to be separated from the separator 2 when the separator 2 is deformed due to receiving a gas pressure, thereby generating a possibility of gas leakage.

Japanese Patent Publication 2002-124275 discloses a seal structure where a gas manifold and a coolant manifold have the same width. In such a structure, a design that a seal line extends straight and a gas seal line and a coolant seal line are overlapped in a fuel cell stacking direction can be easily adopted.

However, even by the seal structure of Japanese Patent Publication 2002-124275, the problem of the passage "C" of FIG. 8 cannot be solved. More particularly, since no gas seal and no coolant seal exist for allowing gas and coolant to flow at the connecting gas passage between the gas manifold and the gas passage of the central portion of the fuel cell and at the connecting coolant passage between the coolant manifold and the coolant passage of the central portion of the fuel cell, the gas seal and the coolant seal cannot operate as a back-up to each other at the connecting gas passage and the connecting coolant passage. As a result, the problem that when a gas pressure acts on the separator, the separator is deformed and the seal is separated from the separator to generate leakage still remains.

Further, in the fuel cell disclosed in Japanese Patent Publication 2002-124275, the gas manifold and the coolant manifold have the same width and the gas seal line and the coolant seal line happen to be overlapped in the fuel cell stacking direction. However, in the fuel cell illustrated in FIG. 8 where the width of the gas manifold and the width of the coolant manifold are different from each other, usually the gas seal line and the coolant seal line cannot be overlapped in the fuel cell stacking direction. As a result, the problem of the portion "B", that is, the problem that the seal line is bent and when the separator is deformed locally, the seal is separated from the separator to cause leakage, cannot be solved.

Document US 2003/0091885 A1 discloses an electrolyte membrane-gasket assembly for a fuel cell, including a polymer electrolyte membrane and a gasket, made of a seal material, covering the peripheral portion of the electrolyte membrane, in which the electrolyte membrane has a sequence of a plurality of through-holes in the peripheral portion, and a portion of the gasket covering one surface of the electrolyte membrane and a portion covering the other surface are connected to each other through the through-holes of the electrolyte membrane.

Document US 2003/0186106 A1 discloses a fuel cell stack comprising a plurality of fuel cells, each having an anode flow field plate, a cathode flow field plate and a membrane electrode assembly disposed between the flow field plates. The anode and cathode flow field plates have primary channels and ribs separating the primary channels. At least a portion of the anode and cathode primary channels are disposed directly opposite one another with a membrane exchange assembly therebetween and with at least some of the ribs on the anode and cathode flow field plates located directly opposite one another to sandwich the membrane exchange assembly therebetween.

Document US 2002/0182471 A1 discloses a sealing method and apparatus for a fuel cell stack that includes a stack of flow plates, a first gasket that is compatible with a coolant and a second gasket that is incompatible with coolant. The first gasket forms a seal around a coolant manifold passageway between an adjacent pair of plates. At least one region of a particular plate may be associated with a reactant flow, and this plate may include internal passageways that extend between manifold passageways to communicate a coolant. A seal that is substantially permanent isolates the internal passageways from the regions of the fuel cell plate that may be associated with reactant flows.

Document US 2003/0072988 A1 discloses seals for fuel cells and fuel cell stacks, wherein in a fuel cell stack assembly having a plurality of plates with grooves for accommodating gaskets. Seals are provided between individual fuel cell plates in the fuel cell stack assembly in order to prevent leakage of gases and liquids required for operation of the fuel cell stack assembly.

Document US 2002/0031698 A1 discloses a fuel cell having sealant for sealing a solid polymer electrolyte membrane, wherein a seal contacts the projecting portion which extends from the solid polymer electrolyte membrane and which projects from the peripheries of the anode side diffusion electrode and the cathode side diffusion electrode while the membrane electrode assembly is disposed between the separators.

Document EP 1 302 996 A2 discloses a polymer electrolyte fuel cell comprising a unit cell comprising a membrane electrode assembly (MEA) comprising a polymer electrolyte membrane, a gasket covering the periphery of the electrolyte membrane, an anode and a cathode attached to the electrolyte membrane; and conductive separator plates sandwiching the MEA therebetween.

Document US 2002/0122970 A1 discloses a method for fabricating a seal-integrated separator for a fuel cell, wherein a seal-integrated separator having first to fourth seals which are integrated on both sides of the separator body is fabricated.

A first problem to be solved by the present invention is that at the gas and coolant connecting passages between the gas and coolant manifolds and the gas and coolant passages at the central portion of the fuel cell, one of the gas seal and the coolant seal at the opposite sides of the separator is not provided. As a result, the gas seal and the coolant seal at the opposite sides of the separator cannot operate as a back-up to each other, and sealing characteristic and stability of the seal on a backside of the interrupted seal portion are degraded.

A second problem to be solved by the present invention is that, in addition to the first problem, in the case where the width of the gas manifold and the width of the coolant manifold are different from each other, the gas seal line and the coolant seal line are not overlapped to each other, and sealing characteristic and stability of the non-overlapped portion of the seal line are degraded.

SUMMARY OF THE INVENTION

A first object of the present invention is to provide a seal structure of a fuel cell where good sealing characteristic and good stability of a seal are assured even at gas and coolant connecting passages between the gas and coolant manifolds and the gas and coolant passages of a central portion of the fuel cell.

A second object of the present invention is, in addition to the first object, to provide a seal structure of a fuel cell where good sealing characteristic and good stability of a seal are assured even when the a width of the gas manifold and a width of the coolant manifold are different from each other.

A seal structure of a fuel cell according to the present invention to achieve the above objects may be described as follows:

(1) A seal structure according to the present invention is for a fuel cell. The fuel cell includes an MEA, a separator, a gas passage formed in the separator, a gas manifold formed in the separator, a connecting gas passage formed in the separator and between the gas passage and the gas manifold, a coolant passage formed in the separator, a coolant manifold formed in the separator, a connecting coolant passage formed in the separator and between the coolant passage and the coolant manifold, and a seal for preventing gas and/or coolant from leaking and defining a continuous seal line.

The seal structure of a fuel cell according to the present invention includes an interrupted back-up disposed at least one of the connecting gas passage and the connecting coolant passage. The back-up located on one side of the separator and a portion of seal line located on the other side of the separator are overlapped to each other in a fuel cell stacking direction, wherein said back-up may be formed in the separator and may include a rib having a convex and concave structure.

(2) The back-up may be disposed at the connecting gas passage between the gas passage of the central portion of the fuel cell and the gas manifold.

(3) The back-up may be disposed at the connecting coolant passage between the coolant passage of the central portion of the fuel cell and the coolant manifold.

(4) The gas manifold and the coolant manifold differs form each other in width. The interrupted back-up and a portion of the seal line positioned in an extension of the interrupted back-up are arranged to be disposed on or along a same straight line.

(5) In the seal structure of a fuel cell of item (1) above, the back-up is formed in the separator and may include a plurality of protrusions spaced from each other.

(6) In the seal structure of a fuel cell of item (1) above, the back-up is formed in the separator and may include a rib having a plurality of tunnels formed in the rib and spaced from each other.

(7) In the seal structure of a fuel cell of item (1) above, an entire portion of the back-up located between adjacent separators is formed in one of either separator of the adjacent separators.

(8) In the seal structure of a fuel cell of item (1) above, a portion of the back-up located between adjacent separators is formed in one separator of the adjacent separators, and a remaining portion of the back-up located between adjacent separators is formed in the other separator of the adjacent separators.

(9) A seal structure according to the present invention is for a fuel cell. The fuel cell includes an MEA, a separator, a gas passage formed in the separator, a gas manifold formed in the separator, a connecting gas passage formed in the separator and between the gas passage and the gas manifold, a coolant passage formed in the separator, a coolant manifold formed in the separator, a connecting coolant passage formed in the separator and between the coolant passage and the coolant manifold, and a seal for preventing gas and/or coolant from leaking and defining a continuous seal line.

The seal structure of a fuel cell according to the present invention includes an interrupted back-up disposed at least one of the connecting gas passage and the connecting coolant passage. The back-up located on one side of the separator and a portion of seal line located on the other side of the separator are overlapped to each other in a fuel cell stacking direction, wherein said interrupted back-up disposed at said connecting coolant passage is made from a seal material.

With respect to a seal structure of a fuel cell according to the present invention, the following technical advantages are obtained:

According to the seal structure of a fuel cell described in items (1)-(9) above, since the interrupted back-up is formed at least one of the connecting gas passage and the connecting coolant passage, and the interrupted back-up and the continuous seal line located on the backside of the interrupted back-up via the separator are overlapped in the fuel cell stacking direction, the continuous seal line and the separator are backed-up or supported by the interrupted back-up in the fuel cell stacking direction. As a result, even when a gas pressure acts on the separator, the separator will not be deformed and will not be separated from the continuous seal line, and the sealing characteristic and stability of the continuous seal will be maintained well.

Further, since the back-up is interrupted, flow of gas and coolant through the back-up between the manifold and the passage at the central portion of the fuel cell is maintained well.

According to the seal structure of a fuel cell described in item (1) above, since the interrupted back-up is formed in the separator, it is easy to form the interrupted back-up, because the seal structure can be obtained only by a design change of the connecting gas passage and the connecting coolant passage of the separator.

According to the seal structure of a fuel cell described in item (4) above, since the interrupted back-up and the seal line located in the extension of the interrupted back-up are made straight irrespective of a difference between the width of the gas manifold and the width of the coolant manifold, the problem of a stress concentration at the corner of the seal line which is caused in a bent seal line is eliminated, and a good sealing characteristic and stability are obtained over the entire portion of the straight seal line.

BRIEF DESCRIPTION OF THE DRAWINGS

The seal structure of a fuel cell according to the present invention will now be explained with reference to the accompanying drawings, in which.

DETAILED DESCRIPTION OF THE PREFERRED EMBODIMENTS

A seal structure of a fuel cell according to the present invention will be explained with reference to FIGS. 1-7.

Figure 1:
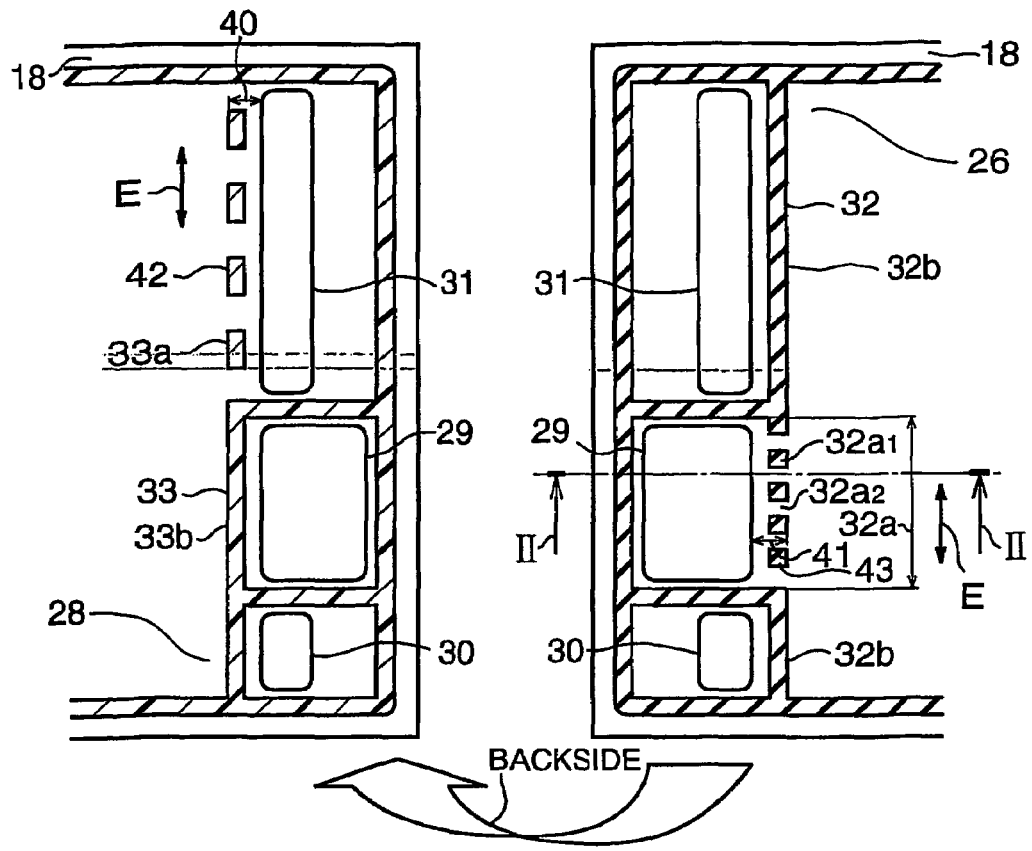
FIG. 1 is a front elevational view of a front surface and a rear surface of a seal structure of a fuel cell according to a first embodiment of the present invention.
Figure 2:
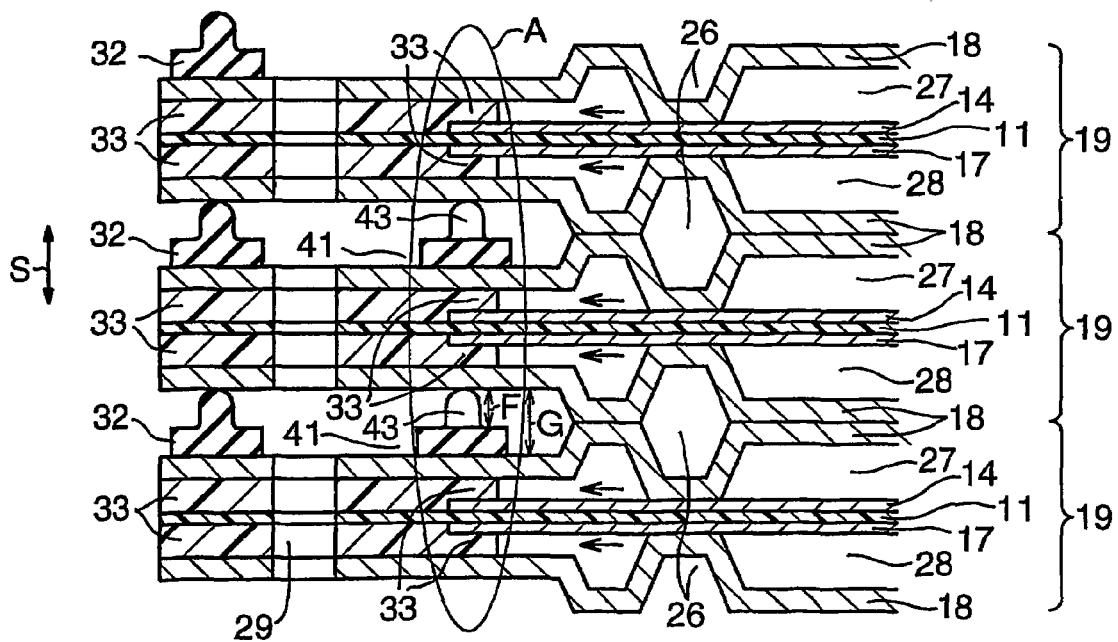
FIG. 2 is a cross-sectional view of the seal structure of FIG. 1 taken along line II-II.
Figure 3:
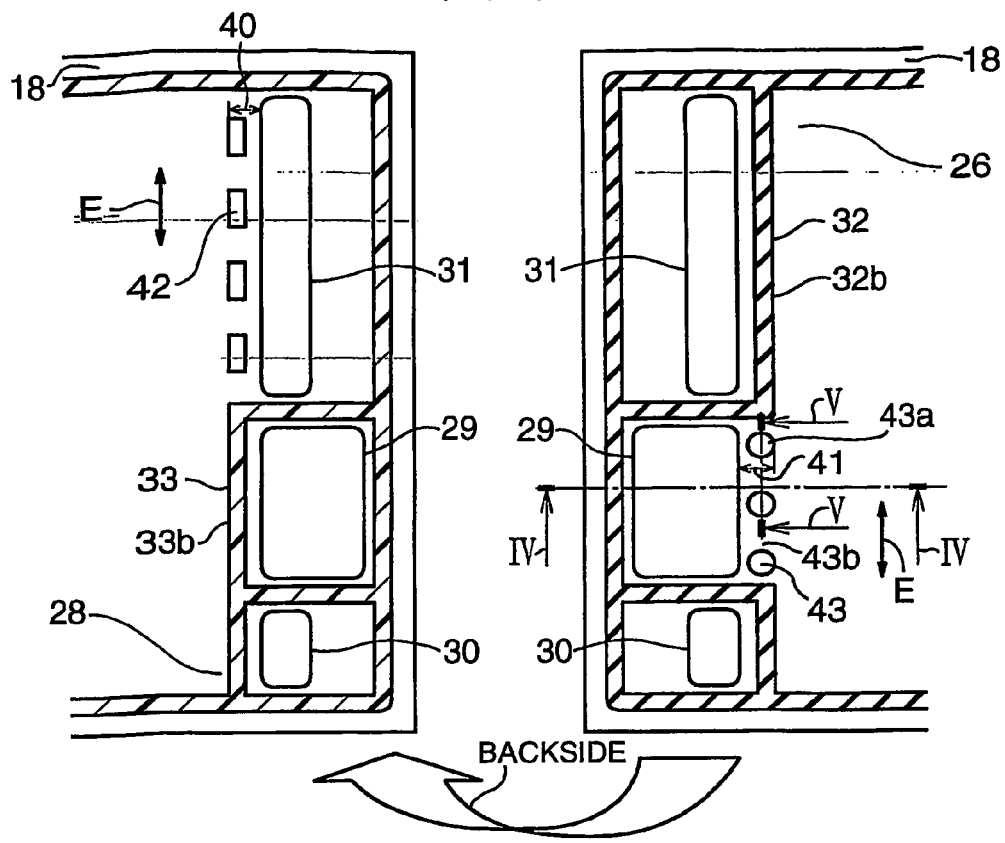
FIG. 3 is a front elevational view of a front surface and a rear surface of a seal structure of a fuel cell according to a second embodiment of the present invention.
Figure 4:
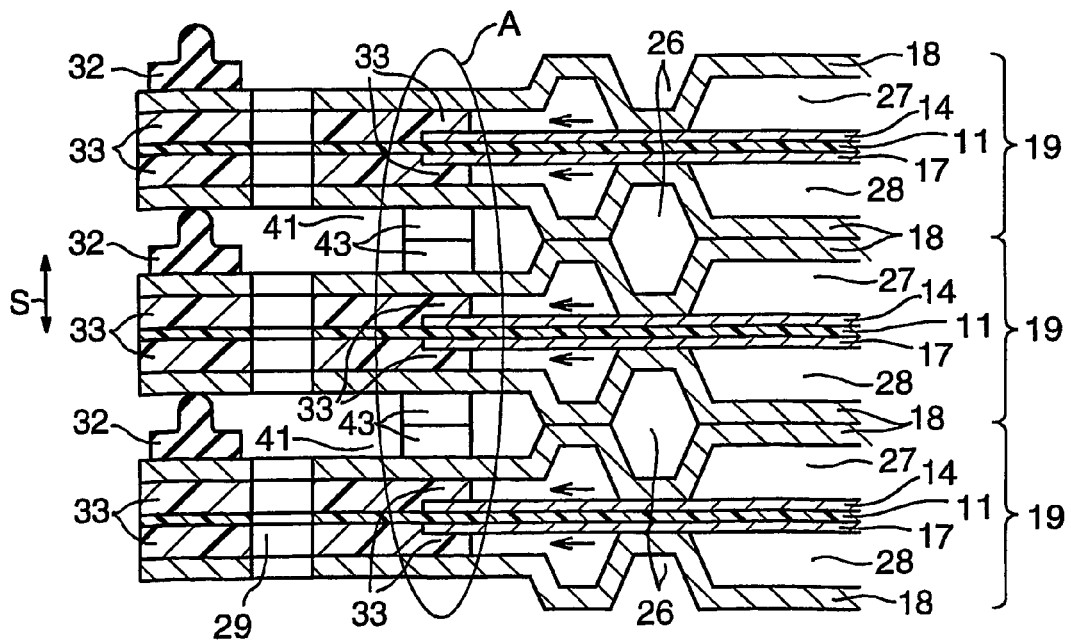
FIG. 4 is a cross-sectional view of the seal structure of FIG. 3 taken along line IV-IV.

FIGS. 1 and 2 illustrate a first embodiment of the present invention where an interrupted back-up is formed in a seal; and FIGS. 3 and 4 illustrate a second embodiment of the present invention where an interrupted back-up is formed in a separator.

Figure 5:
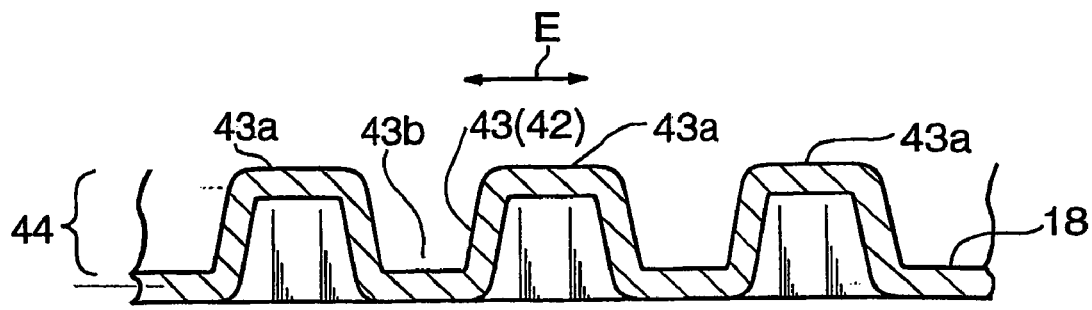
FIG. 5 is a cross-sectional view of one example of a back-up of the seal structure of FIG. 3 taken along line V-V.
Figure 6:
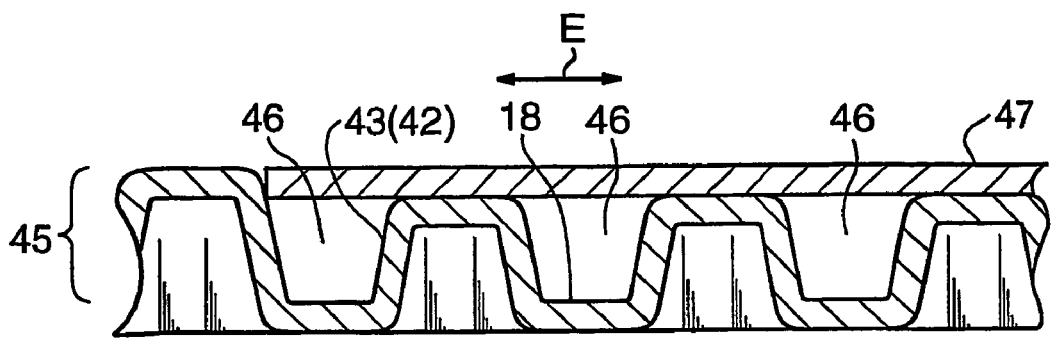
FIG. 6 is a cross-sectional view of another example of the back-up of the seal structure of FIG. 3 taken along line V-V.

FIGS. 5 and 6 illustrate an example of a back-up applicable to each of the first embodiment and the second embodiment of the present invention.

Figure 7:
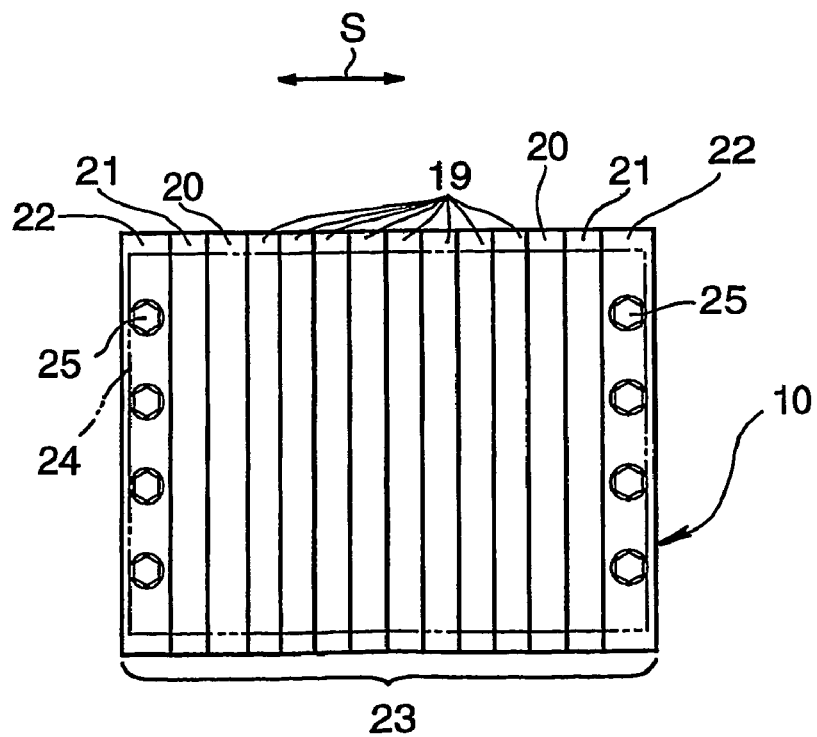
FIG. 7 is a side elevational view of a fuel cell stack including the seal structure according to the present invention.

FIG. 7 is applicable to each of the first embodiment and the second embodiment of the present invention.

Portions common to or similar between the first embodiment and the second embodiment of the present invention are denoted with the same reference numerals throughout the description of the first embodiment and the second embodiment of the present invention.

First, portions common to or similar between the first embodiment and the second embodiment of the present invention will be explained with reference to FIGS. 1, 2 and 7.

A fuel cell in which a seal structure according to the present invention may be used is a layer-type fuel cell, for example, a polymer electrolyte fuel cell 10. The fuel cell 10 is mounted to, for example, a vehicle. However, the fuel cell 10 may be used in an environment other than a vehicle.

The polymer electrolyte fuel cell 10 includes a membrane-electrolyte assembly (MEA) and a separator 18 layered to the MEA. The layering direction is not restricted to a vertical direction and may be any direction including a horizontal direction.

The MEA includes an electrolyte membrane 11 made from an ion exchange membrane, an anode 14 provided on one side of the membrane and including a first catalyst layer, and a cathode 17 provided on the other side of the membrane and including a second catalyst layer. A first diffusion layer may be disposed between the anode 14 and the separator 18, and a second diffusion layer may be disposed between the cathode 17 and the separator 18.

Gas passages, that is, a fuel gas passage 27 for supplying fuel gas (e.g., hydrogen) to the anode 14 and an oxidant gas passage 28 for supplying oxidant gas (e.g., oxygen, usually, air) to the cathode 17 are formed in central portions (power generating areas) of MEA opposing surfaces of the separators 18, and a coolant passage 26 for supplying coolant (e.g., water) is formed in central portions (power generating areas) of opposite surfaces of the separators 18. Further, a fuel gas manifold 30 for supplying and exhausting fuel gas to and from the fuel gas passage 27, an oxidant gas manifold 31 for supplying and exhausting oxidant gas to and from the oxidant gas passage 28, and a coolant manifold 29 for supplying and exhausting coolant to the coolant passage 26 are formed in a non-power generating portion of the separator 18.

The MEA and the separator 18 are layered to construct a unit fuel cell 19, and at least one fuel cell (for example, one to three fuel cells) forms a module. A number of modules are piled (FIG. 7), and electrical terminals 20, electrical insulators 21, and end plates 22 are disposed at opposite ends of the pile of modules (all of the elements 19) to construct a stack of fuel cells 23. After tightening the stack of fuel cells 23 between the end plates 22 in a fuel cell stacking direction S, the end plates 22 are coupled to a fastening member 24 (for example, a tension plate) extending in the fuel cell stacking direction S outside the pile of modules by bolts or nuts 25. The bolts 25 extend in a direction perpendicular to the fastening member 24 and are threaded to the end plates 22.

At the anode 14 of each fuel cell 19, hydrogen changes to positively charged hydrogen ions (i.e. protons) and electrons. The hydrogen ions move through the electrolyte membrane 11 to the cathode 17 where the hydrogen ions react with oxygen supplied and electrons (which are generated at an anode of the adjacent MEA and move to the cathode 17 of the instant MEA through a separator, or which are generated at an anode of a fuel cell located at a first end of the fuel cell stack and move to a cathode of a fuel cell located at a second, opposite end of the fuel cell stack through an external electrical circuit) to form water as follows:

At the anode: 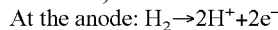
At the cathode: 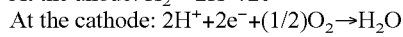

The separator 18 may be any of a carbon separator, a metal separator, an electrically conductive synthetic resin separator, a combination of a metal separator and a synthetic resin frame, and a combination of any of the preceding.

To seal the fluid paths 26, 27, 28, 29, 30 and 31, a gas seal 33 and a coolant seal 32 are provided. The gas seal 33 may be made from adhesive and the coolant seal 32 made from a gasket (e.g., a rubber gasket). Alternatively, the gas seal 33 may be made from a gasket and the coolant seal 32 may be made from a combination of a gasket and adhesive. Still further, either the gas seal 33 or the coolant seal 32 may be made from a combination of a gasket and adhesive.

When a fastening force is imposed on the stack of fuel cells 23, a seal force is imposed on the gas seal 33 and the coolant seal 32 in the fuel cell stacking direction.

In the separator 18, a connecting gas passage 40 located between and for connecting the fuel gas manifold 30 and the fuel gas passage 27 of the central portion of the separator (power generating portion of the fuel cell), a connecting gas passage 40 located between and for connecting the oxidant gas manifold 31 and the oxidant gas passage 28 of the central portion of the separator (power generating portion of the fuel cell), and a connecting coolant passage 41 located between and for connecting the coolant manifold 29 and the coolant passage 26 of the central portion of the separator are formed. An interrupted back-up 42, 43 (where "interrupted" means that at least a portion of a back-up material is discontinuous in a back-up extending direction E) is formed at least one of the connecting gas passage 40 and the connecting coolant passage 41, where the interrupted back-up 42 is a back-up formed at the connecting gas passage 40 and the interrupted back-up 43 is a back-up formed at the connecting coolant passage 41. The interrupted back-up may be formed only at the connecting gas passage 40, or only at the connecting coolant passage 41, or both at the connecting gas passage 40 and the connecting coolant passage 41.

The interrupted back-up 42, 43 (the interrupted back-up 42 at the connecting gas passage 40, the interrupted back-up 43 at the connecting coolant passage 41) which is located at a first surface of the separator 18 and a portion of the continuous seal line 32, 33 which is located at a second, opposite surface of the separator 18 so as to correspond in position in the fuel cell stacking direction S to the interrupted back-up 42, 43, respectively (that is, a portion of the seal line 32 corresponds in position in the fuel cell stacking direction to the interrupted back-up 42, and a portion of the seal line 33 corresponds in position in the fuel cell stacking direction to the interrupted back-up 43), are overlapped to each other in the fuel cell stacking direction S, as illustrated in FIG. 1 and in a portion "A" of FIG. 2.

The interrupted back-up 42, 43 may be formed in the seal 33 or 32, or may be formed in the separator 18, as perhaps better illustrated in FIGS. 5 and 6.

In a case where the interrupted back-up 42, 43 is formed in the seal 33 made from adhesive, the interrupted back-up 42, 43 can be formed by coating a seal material on the separator discontinuously in a back-up extending direction E to provide a plurality of portions of adhesive 33a which are spaced from each other in the back-up extending direction E (FIG. 1).

In a case where the interrupted back-up 42, 43 is formed in the seal 32 made from a gasket, the interrupted back-up 42, 43 ($32a_1$) can be formed by removing portions of gasket material to form concaves $32a_2$ or grooves which are spaced from each other in a back-up extending direction and have a depth F equal to or smaller than a height G of the gasket 32 (FIGS. 1 and 2).

In a case where the interrupted back-up 42, 43 is formed in either one of the separator 18 and the seal 32, 33, the interrupted back-up 42, 43 may include a rib 44 having a convex and concave structure (FIG. 5), or may include a plurality of protrusions (FIG. 4) spaced from each other (FIG. 3), or further may be a rib 45 having a plurality of tunnels 46 formed in the rib and between the separator 18 and a cover plate 47 and spaced from each other in the back-up extending direction E (FIG. 6). The interrupted back-up 42, 43 formed in either one of the separator 18 and the seal 32, 33 may include a combination of the structures above.

In a case where the interrupted back-up 42, 43 is formed in the separator 18, (a) an entire portion of the back-up 42, 43 located between adjacent separators 18 may be formed in either one separator of the adjacent separators 18 (FIG. 5), or (b) a portion in height or in extending direction of the back-up 42, 43 located between adjacent separators 18 may be formed in one separator of the adjacent separators 18, while a remaining portion of the back-up 42, 43 located between adjacent separators 18 is formed in the other separator of the adjacent separators 18 (FIG. 4).

The reason for providing the interrupted back-up 42 at the connecting gas passage 40 and the interrupted back-up 43 at the connecting coolant passage 41 is to back-up (or support) the separator 18 from the connecting passage side so that the separator 18 is not deformed toward the connecting passage 40, 41 when a gas pressure acts on the separator 18. The reason for forming the back-up 42, 43 interruptedly or discontinuously in the back-up extending direction E is to allow fluid (gas or coolant) to flow through the back-up.

Figure 8:
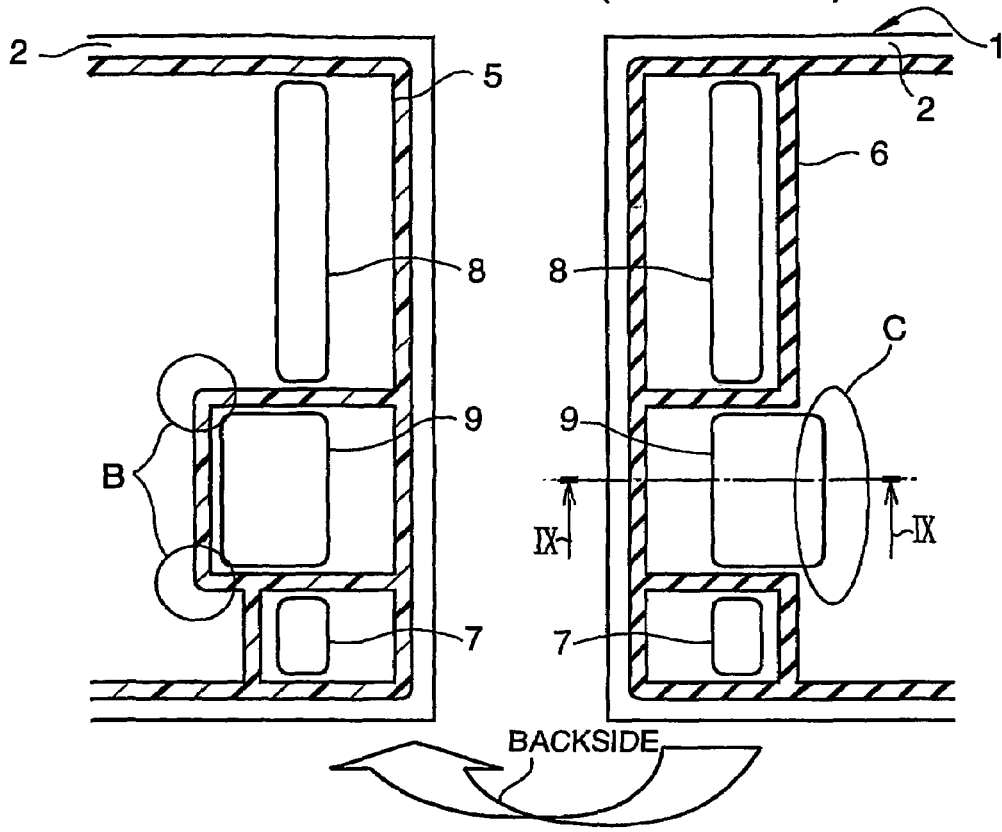
FIG. 8 is a front elevational view of a front surface and a rear surface of a seal structure of a conventional fuel cell.
Figure 9:
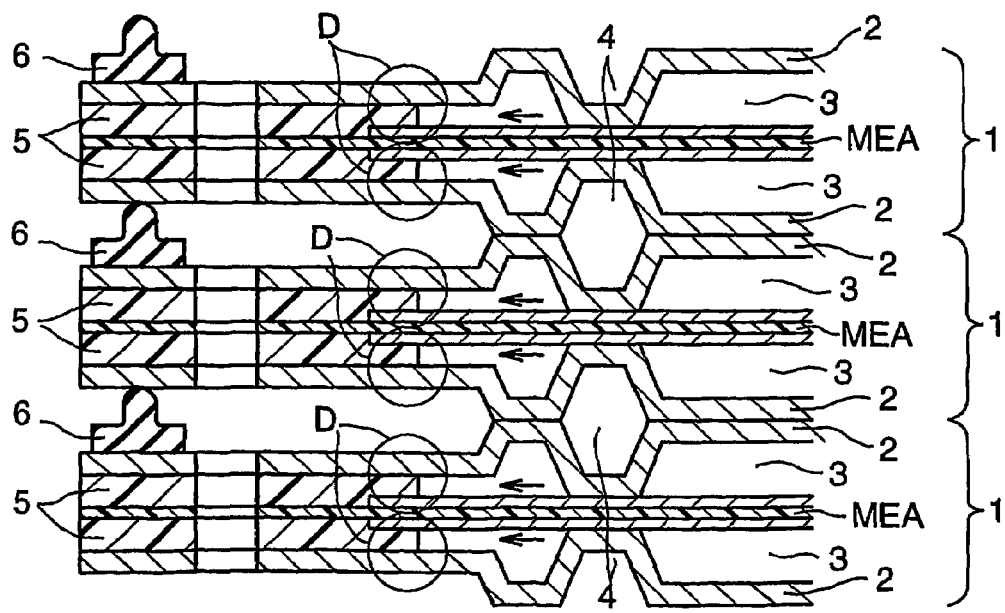
FIG. 9 is a cross-sectional view of the seal structure of FIG. 8 taken along line IX-IX.

Further, in a case where a width of the gas manifold 30, 31 (the fuel gas manifold 30, the oxidant gas manifold 31) and a width of the coolant manifold 29 are different from each other, the interrupted back-up 42, 43 and a portion 33b, 32b of the seal line 33, 32 positioned in an extension of the interrupted back-up 42, 43 are arranged to be disposed on a same straight line (FIGS. 1 and 3). In the case where the gas manifold 30, 31 and the coolant manifold 29 differ from each other in width, in known arrangements, the interrupted back-up 42, 43 and the continuous seal line 33, 32 will not be on or along the same straight line as was described with reference to FIG. 8. By contrast, in embodiments of the present invention the interrupted back-up 42, 43 and the portion 33b, 32b of the continuous seal line 33, 32 are caused to be on or along the same straight line.

Effects and technical advantages of the portions described above common to and similar between the first and second embodiments of the present invention will now be explained.

First, since the interrupted back-up 42, 43 is formed at least one of the connecting gas passage 40 and the connecting coolant passage 41, and the interrupted back-up 42, 43 and the continuous seal line 32, 33 located on the backside of the interrupted back-up 42, 43 via the separator 18 are overlapped in the fuel cell stacking direction, the continuous seal line 32, 33 and the separator 18 are backed-up or supported by the interrupted back-up 42, 43 in the fuel cell stacking direction. As a result, even when a gas pressure acts on the separator 18, the separator 18 will not be deformed toward the connecting passages 40, 41 and will not be separated from the continuous seal line 32, 33. As a result, the sealing characteristic and stability of the continuous seal will be maintained well.

Further, since the back-up 42, 43 is interrupted, flow of gas and coolant through the back-up 42, 43 between the manifold and the passage at the central portion of the fuel cell is maintained well.

Furthermore, since the back-up 42, 43 and the portion of the seal line located in the extension of the back-up 42, 43 are made to be disposed on or along the same straight line irrespective of difference between the width of the gas manifold 30, 31 and the width of the coolant manifold 29, the problem of a stress concentration at the corner "B" (FIG. 8) of the seal line which is caused in a bent seal line (FIG. 8) is eliminated in the present invention, and a good sealing characteristic and stability are obtained over the entire portion of the straight seal line 33, 32 in the seal structure of the present invention.

Next, structures, effects and technical advantages unique to each embodiment of the present invention will be explained.

In a first embodiment of the present invention, as illustrated in FIGS. 1 and 2, the interrupted back-up 43, 42 at the connecting coolant passage 41 is formed in the seal 32, 33.

For example, the coolant-side seal 32 is extended into the connecting coolant passage 41 such that an extension 32a of the seal 32 is located over an entire width of the connecting coolant passage 41. In the extension 32a of the seal 32, a convex $32a_1$ and a concave $32a_2$ (groove) are formed alternately in the extending direction E of the extension 32a of the seal 32 such that a top surface of the convex $32a_1$ contacts a surface of a separator 18 of an adjacent fuel cell and a bottom surface of the concave $32a_2$ is spaced apart from the surface of the separator 18 of the adjacent fuel cell in the fuel cell stacking direction, to form an interrupted back-up 43 at the connecting coolant passage 41. The concave $32a_2$ operates to allow coolant to pass through the interrupted back-up 43. The concave $32a_2$ may be replaced by a tunnel formed in the seal 32.

The seal 32 shown in the drawings is a gasket, but the seal 32 may be an adhesive seal which is in a liquid state during coating and is solidified after coating.

Further, as illustrated in FIG. 1, the interrupted back-up 42 at the connecting gas passage 40 is formed in the seal 33 by coating a seal material (adhesive) on the separator discontinuously in a back-up extending direction to provide a plurality of portions of adhesive 33a which are spaced from each other in the back-up extending direction. The interrupted back-up 42 at the connecting gas passage 40 may be replaced by an interrupted back-up 42 of FIG. 3 formed in the separator 18 or a rib having a plurality of tunnels formed in the separator 18.

As to effects and technical advantages of the seal structure of the fuel cell according to the first embodiment of the present invention, since the interrupted back-up 43, 42 at the connecting coolant passage 41, 40 is formed in the seal 32, 33, it is easy to form the interrupted back-up 43, 42, because the seal structure can be obtained only by a design change of the seal 32, 33 or a change in a coating method of the seal 32, 33. For example, in a case where the seal 32 is a rubber gasket, the seal 32 is made to extend over the entire width of the connecting coolant passage 41 and a plurality of spaces (e.g., grooves, openings, concavities) are formed in the extension of the seal 32, for example by removing portion of seal materials. In a case where the seal 33 is made from adhesive, the adhesive is coated on the separator such that a coated portion and a non-coated portion of the separator appear alternately.

In a second embodiment of the present invention, as illustrated in FIGS. 3 and 4, the interrupted back-up 43, 42 at the connecting coolant passage 41, 40 is formed in the separator 18.

For example, at the connecting coolant passage 41 of the separator 18, a plurality of protrusions 43a (FIG. 5) are formed in the separator 18 so as to be spaced from each other in a width direction E of the connecting coolant passage 41, to construct an interrupted back-up 43 at the connecting coolant passage 41. The protrusion 43a contacts, at a top surface of the protrusion 43a, a portion of a separator 18 of an adjacent fuel cell corresponding in position to a continuous seal 33 of the adjacent fuel cell in the fuel cell stacking direction (or a protrusion of a back-up 43 formed in the separator of the adjacent fuel cell), to operate as a back-up for the separator. A space 43b (FIG. 5) between adjacent protrusions 43a operates as a path for allowing coolant to pass through the interrupted back-up 43.

An interrupted back-up 42 is formed at the connecting gas passage 40 and the interrupted back-up 42 is formed in the separator 18. The interrupted back-up 42 formed in the separator 18 may be replaced by an interrupted back-up formed in the gas-side seal 33 (such as the interrupted back-up 42 illustrated in FIG. 1).

As to effects and technical advantages of the seal structure of the fuel cell according to the second embodiment of the present invention, since the interrupted back-up 43, 42 is formed in the separator 18, it is easy to form the back-up 43, 42, because the seal structure can be obtained only by a design change of the connecting gas passage 40 and the connecting coolant passage 41 of the separator 18, for example, only by forming protrusions in the separator 18 at the connecting passage 40, 41.

It will be understood that other embodiments of the invention will be readily apparent to a person skilled in the art, the scope of the invention being defined in the appended claims.

The invention claimed is:

1. A seal structure of a fuel cell, said fuel cell including an MEA, a separator made from metal, a gas passage formed in said separator, a gas manifold formed in said separator, a connecting gas passage formed in said separator and between said gas passage and said gas manifold, a coolant passage formed in said separator, a coolant manifold formed in said separator, a connecting coolant passage formed in said separator and between said coolant passage and said coolant manifold, and a seal including a gas seal line and a coolant seal line for preventing gas and/or coolant from leaking and defining a continuous seal line, said seal structure of a fuel cell, comprising:

an interrupted back-up disposed at an at least one of said connecting gas passage and said connecting coolant passage, wherein said back-up is located on one side of said separator and a portion of the gas or coolant seal line located on the other side of said separator being disposed such that said back-up and said portion of said seal line are overlapped with each other in a fuel cell stacking direction, wherein said back-up is integrated within said separator and includes a rib having a convex and concave structure, and wherein the other of the gas or coolant seal line is located on the same side as said back-up and includes a straight line portion located on a same straight line as said back-up and wherein the gas seal line is made of adhesive.

2. A seal structure of a fuel cell according to claim 1, wherein said back-up is disposed at said connecting gas passage between said gas passage and said gas manifold.

3. A seal structure of a fuel cell according to claim 1, wherein said back-up is disposed at said connecting coolant passage between said coolant passage and said coolant manifold.

4. A seal structure of a fuel cell according to claim 1, wherein though said gas manifold and said coolant manifold differ in width to each other, said interrupted back-up and a portion of said seal line positioned in an extension of said interrupted back-up are disposed on a same straight line.

5. A seal structure of a fuel cell according to claim 1, wherein said back-up is formed in said separator and includes a plurality of protrusions spaced from each other.

6. A seal structure of a fuel cell according to claim 1, wherein said back-up includes a rib having a plurality of tunnels formed in said rib and spaced from each other.

7. A seal structure of a fuel cell according to claim 1, wherein an entire portion of said back-up located between adjacent separators is formed in one separator of the adjacent separators.

8. A seal structure of a fuel cell according to claim 1, wherein a portion of said back-up located between adjacent separators is formed in one separator of the adjacent separators, and a remaining portion of said back-up located between adjacent separators is formed in the other separator of the adjacent separators.

9. A seal structure of a fuel cell according to claim 1, wherein said back-up is formed in said separator and includes a rib having a plurality of tunnels formed in said rib, between the separator and a cover plate, and spaced from each other, and the cover plate contacts an adjacent separator.

10. A seal structure of a fuel cell, said fuel cell including an MEA, a separator made from metal, a gas passage formed in said separator, a gas manifold formed in said separator, a connecting gas passage formed in said separator and between said gas passage and said gas manifold, a coolant passage formed in said separator, a coolant manifold formed in said separator, a connecting coolant passage formed in said separator and between said coolant passage and said coolant manifold, and a seal including a gas seal line and a coolant seal line for preventing gas and/or coolant from leaking and defining a continuous seal line, said seal structure of a fuel, comprising:

an interrupted back-up disposed at an at least one of said connecting gas passage and said connecting coolant passage, wherein said back-up being located on one side of said separator and a portion of the gas or coolant seal line located on the other side of said separator being disposed such that said back-up and said portion of said seal line are overlapped with each other in a fuel cell stacking direction, wherein said back-up is integrated within said separator and includes a rib having a convex and concave structure, wherein the other of the gas or coolant seal line is located on the same side as said back-up and includes a straight line portion located on a same straight line as said back-up and the gas seal line is made from an adhesive, wherein said back-up is formed at the at least one of said connecting gas passage and said connecting coolant passage at a portion of said separator where the seal does not exist, and wherein said back-up is formed in said separator and includes a rib having a plurality of tunnels formed in said rib, between the separator and a cover plate, and spaced from each other, and the cover plate contacts an adjacent separator.

* * * * *

UNITED STATES PATENT AND TRADEMARK OFFICE
CERTIFICATE OF CORRECTION

PATENT NO. : 7,608,355 B2 Page 1 of 1
APPLICATION NO. : 10/574565
DATED : October 27, 2009
INVENTOR(S) : Tomokazu Hayashi et al.

It is certified that error appears in the above-identified patent and that said Letters Patent is hereby corrected as shown below:

Column | Line

10 | 59 | After "back-up" delete "is formed in said separator and".

Signed and Sealed this

Nineteenth Day of January, 2010

David J. Kappos
*Director of the United States Patent and Trademark Office*